United States Patent [19]

Betz et al.

[11] Patent Number: 5,432,568
[45] Date of Patent: Jul. 11, 1995

[54] EYEWEAR HAVING TRANSLUCENT SUPERIOR AND INFERIOR FIELDS OF VIEW

[75] Inventors: Robert C. Betz, deceased, late of Worthington, Ohio, by Mary M. Betz, Administrator; Richard D. Gilson, Oviedo, Fla.

[73] Assignee: Foggles, Inc., Columbus, Ohio

[21] Appl. No.: 179,093

[22] Filed: Jan. 10, 1994

[51] Int. Cl.⁶ .............................................. G02C 7/16
[52] U.S. Cl. ........................................ 351/45; 351/53
[58] Field of Search .................. 351/45, 44, 53, 41

[56] References Cited

U.S. PATENT DOCUMENTS

| | | | |
|---|---|---|---|
| 3,791,722 | 2/1974 | Ahlberg et al. | 351/45 |
| 4,470,673 | 9/1984 | Gilson et al. | 351/44 |
| 4,698,022 | 10/1987 | Gilson | 434/36 |
| 4,824,234 | 4/1989 | Sparks et al. | 351/53 |
| 5,177,510 | 1/1993 | Peters et al. | 351/45 |

OTHER PUBLICATIONS

Guth, S. K. "Discomfort Glare," Amer. J. Optom. and Arch. Am. Acad. Optom., 38, pp. 247–258 (1961).

Primary Examiner—William L. Sikes
Assistant Examiner—Hung Xuan Dang
Attorney, Agent, or Firm—Mueller and Smith

[57] ABSTRACT

Eyewear for use by a person exposed to an environment of glare-inducing illumination. The eyewear has a frontal portion for confronting the eyes, which frontal portion extends between an upper and lower periphery. A transparent optical region is provided within the frontal portion for intercepting lines of sight substantially above and below the slightly elevated standard line of sight at the mid-pupillary position of the eyes. For normalizing overhead and reflected glare to a level of diffuse illumination reducing veiling luminance and asthenopic effects, upper and lower translucent regions are provided within the frontal portion. The upper translucent region extends substantially upwardly from between the standard line of sight and the upper periphery of the frontal portion. The lower translucent region extends substantially downwardly from between the standard line of sight and the lower periphery of the frontal portion.

21 Claims, 3 Drawing Sheets

EYEWEAR HAVING TRANSLUCENT SUPERIOR AND INFERIOR FIELDS OF VIEW

BACKGROUND OF THE INVENTION

Skeet, trap, sporting clays, and hunting are just a few of the increasingly popular sports which require the shooting of a moving target with a shotgun. Indeed, as of 1993, there were over 17,000 members in the National Skeet Shooting Association, the governing body of all skeet shooting in the United States. The Amateur Trap Shooting Association, which serves as the governing body for all registered trap shoots, boasts a membership of over 100,000. Sporting clays, which developed in England in 1925, although having had a somewhat slower start, has too seen an increase in popularity since 1985. As to the sport of hunting, in 1989 the U.S. Fish and Wildlife Service estimated there were nearly 16 million licensed hunters, which makes hunting one of the most popular sports in the United States.

In skeet, targets called "birds" are thrown at speeds of about 75 mph (120 kmph) by mechanical or electrical "traps" from a pair of houses, one low and one high, which are spaced-apart a distance of about 37 yards (34 m). From each of a group of eight stations positioned along an arc extending between the houses, the skeet shooter shoots at a target thrown from the high house, and then at one thrown from the low house. At stations one, two, six and seven, however, the shooter also shoots at a double, which consists of a pair of targets released simultaneously, one from the high house and one from the low house. For these doubles, as the target thrown from the high house travels at a relatively steeper trajectory than that of the target thrown from the low house, the targets are made to intersect at a point near the middle of the field. To successfully hit a target, the skeet shooter must lead the target to compensate for its speed, angle, and distance. At each station of a skeet field, there is known to be a unique, predetermined amount of lead that must be taken to break the target.

In trap, like skeet, a shooter attempts to hit targets thrown at speeds of about 75 mph (120 kmph). The targets in trap, however, are thrown away from the shooter at five different angles from a pit located below ground level in the middle of a field. Shooting from five successive stations positioned in an arcuate row behind the pit, the trap shooter, like the skeet shooter, must lead each target to compensate for its speed, angle, and distance.

In sporting clays, targets, which may be of five different sizes and may range in color from white, yellow, orange, or black, are thrown from a wooded setting at a higher rate of speed than either trap or skeet targets in order to simulate actual hunting conditions. The sporting clays shooter shoots the targets, which are released as either singles, following pairs, report doubles or true doubles, from various stations along a pre-arranged course. Unlike in skeet or trap, however, the sporting clay shooter may not mount the shotgun until the target is thrown and becomes completely visible. Because of the speed, size, and colors of the targets, coupled with the varied backgrounds of the wooded or other natural settings around which the sporting clays range is designed, complete concentration on the target is of the utmost importance. As in trap and skeet, the sporting clay shooter too must lead the target to compensate for its speed, angle, and distance. So too in the other, somewhat lesser known shotgun sports of tower shoots, flushes, crazy quail and quail walks, and in the more internationally-known sports of Olympic Trap and Skeet, pigeon shooting, and driven pheasants, must the shooter import the principals of target concentration and lead compensation.

In the sport of hunting, the target, an animal, usually is naturally camouflaged and difficult to see, and generally moves along an unpredictable path at changing speeds. Wooded areas which generally exhibit a mottled, cluttered background, and open fields which may provide a bright background, also affect the hunter's ability to spot game. Accordingly, as in the other shooting sports, it is important that the hunter devote full concentration on the target and, when hunting running game, compensate for the speed, angle, and distance of such game.

Beginners in any of the shooting sports quickly discover that shooting a moving target is quite difficult. Such difficulty is compounded with respect to the shooting sports which employ a shotgun, as such sports typically involve a smaller and faster moving target be it a clay, a rabbit, or a bird. Generally, a shotgun has a smooth-bored barrel with a relatively large inner diameter as compared to a rifle. The shotgun shell houses a group of small, metal pellets called shot which, when fired, assume a fountain-like spread as they leave the barrel. This fountain-like pattern, called a shotstring, makes it somewhat easier to hit a moving target as providing the shooter with a larger region of possible impact, as compared to a single projectile, within which the target may be intercepted. An experienced shooter will aim at the target using a smooth, continuous motion. A small steel or plastic bead-sight attached to the barrel of the gun typically is provided to aid the shooter in aiming the shotgun at the target.

To achieve successful results, the shooter must mount and aim the shotgun properly. When mounting the shotgun, the shooter must bring the butt-end of the stock to the shoulder and the side of the stock to the face. In this position, the shooter's eye which is nearest to the stock is made to look directly along what is termed a "sight axis" which extends along the top barrel of the shotgun to the bead-sight. Once the shotgun is properly mounted, the shooter's head, preferably, is not moved with respect to the gun. In this way, a consistent body position is achieved, and the gun is maintained at the same position relative to the shooter's eye for use as a reference while the shooter is concentrating and focusing visually on a target moving farther afield. In aiming the gun at the target, the shooter preferably keeps both eyes opened to obtain a wider range of vision. Such vision gives the shooter additional time for target acquisition and concentration. Indeed, a shooter attempting to hit a moving target while using only one eye for aiming is greatly restricted in vision and, consequently, in ability to hit the target.

As aforementioned, in order to hit a target, the shooter must lead the target to compensate for its speed, angle and distance. To obtain a proper lead, the shooter must concentrate intensely on the target, and yet still must be aware of the location of the end of the shotgun as such end is used as a reference as to where the gun is pointed. At least with respect to skeet, trap, and sporting clays, there are three basic methods of obtaining the proper lead to successfully hit a target: the pass through method, the acceleration method, and the sustained lead method. In using the pass through method, the shooter starts the gun behind the target, swings the gun to overtake and pass through the target, and then fires. Thus, to successfully hit a target using the pass through method, the shooter must concentrate on the target and pass the bead-sight on the muzzle of the shotgun through the target.

In using the acceleration method, the shooter aims the gun directly at the target and tracks it through the air. When ready to shoot, the shooter accelerates the gun past the target and then fires. Thus, to successfully hit a target using the acceleration method, the shooter must place the bead-sight of the shotgun on the target, and then track the target with the sight before accelerating the gun to shoot.

Lastly, in using the sustained lead method, the movement of the gun is started simultaneously at target release, which movement is maintained to effect a constant lead in front of the target. With the sustained lead method, the shooter may fire at the target at anytime during its flight. To successfully break a target using the sustained lead method, the shooter must concentrate on the target, and yet remain aware of the orientation of the barrel of the shotgun as a reference point to verify that the correct lead has been taken to break the target. At least for skeet shooting, the sustained lead method currently is considered the most accurate method of leading a target. However, in utilizing any of the lead methods, the shooter must intensely concentrate on the target while remaining aware of the location of the tip of the barrel of his shotgun.

For all of the above shooting techniques, the eyes of the shooter are concentrated at the target while the arms, head, and eyes are moved in a sweeping motion across the shooting field. For the most part, to aim at the elevated targets, the eyes are looking upwardly and may, for example, scan across the position of the sun or bright, reflecting objects such as buildings. Thus, as the shooter concentrates upon the target, different brightness intensities are encountered. These brightness variations, whether direct or reflected have an effect at the eye station of the shooter.

In view of the foregoing, it will be understood that participants in shooting sports are called upon to perceive with the eye and brain a target which may be moving at speeds of upwards of 70 mph (110 kmph) and at varying distances. Although the human brain is in function similar to a super computer, the eye from which it receives information is comparatively primitive. In gross anatomy, the eye is a simple lens which focuses on an image plane called the retina, which is a delicate, multi-layered, light-sensitive membrane lining the inner surface of the eye connected by the optic nerve to the brain. Through changes in the curvature of the lens brought about by its elasticity and contraction of the ciliary, i.e., accommodation, muscles of the eye, light rays are focused on the retina where they stimulate sensory receptors. With advancing age, the eye becomes increasingly difficult to focus due to a loss in the elasticity of the lens and weakening of ciliary muscles, which results in a visual condition referred to as presbyopia.

Further, as light within the visual spectrum is considered "broad spectrum" as composed of many wavelengths or "colors," the lens of the eye is not always able to accommodate such that all of the wavelengths are focused exactly on the focal plane at the retina. Such accommodation inability is known to result in what is termed "chromatic aberration." Chromatic aberration is a phenomenon associated with broad-spectrum light wherein the eye will provide a focus position for a given object depending upon the wavelength of the light emanating from the object to be focused. Inasmuch as in any normal viewing situation, the image of an object is contained in light having a variety of wavelengths, essentially only one such wavelength can be focused precisely at the retina. Thus, all the other wavelengths will be focused at some focal length forward or rearward of the retina. The farther any given wavelength is focused from the retina, the more blurred its image becomes. With respect to focusing problems caused by either chromatic aberrations or advancing age, the brain is called upon to process images resulting from the distorted information received from the eye.

For shooters, the visual input data to the brain additionally is compromised by the inability of the eye to simultaneously focus both on the near bead at the tip of the shotgun and on the distant target itself, nor with both on the high detail area of the retina, namely the fovea. Thus, the shooter must concentrate and focus clearly on one object, the target for example, while the other object, i.e., the tip of the gun is seen in less detail. However, because of training, an experienced shooter will have a mental awareness as to the position of the gun sight and visual concentration may remain upward and outward.

All intelligent shooters wear glasses, and most wear specially-designed shooting glasses. Principally, shooting glasses are worn for safety as shot may ricochet from the target, and the target itself may present a hazard as its fragments when hit. In this regard, the lenses of shooting glasses typically are formed of a polymeric material, such as an acrylic, a polycarbonate, or the like, which resists shattering upon impact. An ancillary, but in some respects no less important, function is that of improving the visual acuity of the shooter. For shooters requiring corrective lenses, the need for shooting glasses is obvious. However, even shooters having 20/20 vision benefit from wearing shooting glasses. In this regard, shooting glasses generally are designed with lenses tinted with pigmentation in the mid-spectral range, i.e., at some level of yellow. Such pigments are selected as it is accepted that a mid-spectral tint reduces chromatic aberration for improved focus on the target.

Although the shooting glasses heretofore known in the art have gained acceptance as being tinted to reduce chromic aberration and/or for use as protective sunglasses, vision problems nevertheless have persisted, especially with competition shooters. In particular, eye-related problems such as, eye muscular fatigue, headaches, and eye redness occur, such problems generally being identified as asthenopia, i.e., eyestrain or tiring of the eyes due to fatigue of the ciliary or extraocular muscles. As explained by Gilson et at., U.S. Pat. No. 4,470,673, the disclosure of which is expressly incorporated herein by reference, a number of environmental factors have been determined to contribute to asthenopia, a most prominent one being glare. In general, glare phenomena are considered to include a broad range of physiological and psychological factors, as well as physical conditions which combine to make the brightness conditions within any visual environment contribute either favorably or unfavorably to seeing conditions. For example, variations in brightness may influence the visibility of an object of interest in a task such as shooting, and result in a decreased ease of "seeing". Direct glare generally is caused by the viewing of an object of low luminance or brightness, such as a clay target or an animal, in the presence of a considerably higher luminance object, such as the sun. Although a significant reduction in visibility may not be noticed, a general feeling of discomfort often is manifested under direct glare situations. In this regard, the reader's attention is directed to Guth, S. K., "Discomfort Glare," Amer. J. Optom. and Arch. Amer. Acad. Optora., 38, 247 (1961). Glare also may be occasioned indirectly as a result of light being reflected to the eye from the ground particularly where the shooter is looking upwardly at a target. Consider, for example, ground covered by snow, gravel, or calm water surface.

Another factor contributing to sighting difficulties for shooters is the high degree of concentration demanded. That is, it is known that whenever the gaze of the eyes is changed to an object of a different brightness level, some period of time is required for the eyes to adapt to the different luminance level. Indeed, the greater the difference in luminance, the longer the eyes will take to adapt. Thus, the focus of a shooter onto a relatively low luminance target, after having been focused on the usually brighter surroundings, necessitates the adaptation of the eyes to the lower luminance level. Such adaptation, when repeated target after target during shooting competitions or the like, has been known to lead to ocular fatigue and a decreased visual efficiency.

In addition to asthenopia, another vision problem related to overhead glare which plagues shooters and hunters is that of loss of contrast caused, for the most part, by a phenomena known as "veiling luminance." As again explained by Gilson et al., U.S. Pat. No. 4,470,673, veiling luminance results from various imperfections in the structuring of the human eye. These imperfections lead to a light scattering effect which, in turn, causes a distribution of glare-generated illuminance across the retina. Such illuminance, although developing in non-retinal regions of the eye, is known to affect the macula lutea of the retina, i.e., the yellow spot in the center of the retina which, in turn, overlaps the fovea, or central depression of the macula lutea, a tiny area of optimal acuity. The resulting effect on vision is one wherein the overall illuminance at the fovea is elevated, decreasing the contrast, which is essential to image resolution, sharpness, and clarity.

Heretofore, manufacturers of shooting glasses and the like have only addressed the subject matter of brightness at the shooting station by utilizing tinted lenses. As for the use of tinted lenses, the filtering effect achieved by way of a simple transmission reduction generally results in an overall diminished light transmission.

SUMMARY OF THE INVENTION

The present invention is addressed to reducing glare-related vision problems in target shooters, hunters, and others such as fishermen, archers, and the like. In this regard, it has been discovered that by reducing both overhead glare and glare reflected from the ground to an essentially constant level of diffuse illumination, the deleterious effects of eyestrain, veiling luminance, and the like may be mitigated. In diffusively normalizing both overhead and reflected glare, the present invention controls the phenomena of veiling luminance by lessening any scattering of glare-generated light across the retina of the eye. Further, as any variations in brightness must be accommodated by the adaptation of the eyes, the normalizing of glare both direct and reflected to a substantially constant level eases such adaptation by decreasing luminational variances. Ocular fatigue and other problems which may be encountered such as headaches, itching, and eye burning and redness which are associated with asthenopia are thereby reduced.

It therefore is an object of the present invention to provide eyewear for target shooting, hunting, archery, fishing, and the like, which eyewear normalizes overhead and reflected glare to an essentially constant level of diffuse illumination effective to reduce vision problems in the wearer which are related, for example, to asthenopia or veiling luminance phenomenon. The eyewear involves a frontal portion for confronting the eyes of the shooter, which frontal portion extends between an upper and lower periphery. A transparent optical region is provided within the frontal portion for intercepting lines of sight substantially above and below the standard line of sight at the mid-pupillary position of the eyes of the shooter. For normalizing overhead and reflected glare to a level of diffuse illumination reducing veiling luminance and asthenopic effects, upper and lower translucent regions are provided within the frontal portion. The upper translucent region is provided to extend substantially upwardly from between the standard line of sight and the upper periphery of the frontal portion. The lower translucent region is provided to extend substantially downwardly from between the standard line of sight and the lower periphery of the frontal portion.

Another object of the invention is to provide eyewear for use by a person exposed to an environment of glare-inducing illumination. The eyewear involves a frontal portion for confronting the eyes of the person, which frontal portion extends between an upper and lower periphery. A transparent optical region is provided within the frontal portion for intercepting lines of sight substantially above and below the standard line of sight at the mid-pupillary position of the eyes of the person. For normalizing overhead and reflected glare to a level of diffuse illumination reducing veiling luminance and asthenopic effects, upper and lower translucent regions are provided within the frontal portion. The upper translucent region is provided to extend substantially upwardly from between the standard line of sight and the upper periphery of the frontal portion. The lower translucent region is provided to extend substantially downwardly from between the standard line of sight and the lower periphery of the frontal portion.

A further object of the invention is to provide eyewear for use by a person exposed to an environment of glare-inducing illumination, which eyewear has a forward frame portion supporting a frontal portion. The frontal portion defines left and fight eye lens regions for confronting the eyes and extends between an upper and lower periphery. A transparent optical region is provided within the frontal portion for intercepting lines of sight substantially above and below the standard line of sight at the mid-pupillary position of the eyes of the shooter. For normalizing overhead and reflected glare to a level of diffuse illumination reducing veiling luminance and asthenopic effects, upper and lower translucent regions are provided within the frontal portion. The upper translucent region is provided to extend substantially upwardly from between the standard line of sight and the upper periphery of the frontal portion. The lower translucent region is provided to extend substantially downwardly from between the standard line of sight and the lower periphery of the frontal portion.

The present invention, accordingly, comprises the apparatus and method possessing the construction, combination of elements, and arrangement of parts and steps which are exemplified in the detailed disclosure to follow. Another advantage of the present invention is the reduction of glare-related vision problems such as asthenopia or veiling luminance without the imposition of any claustrophobic reaction in the wearer. A further advantage is the restriction without claustrophobic effects, of the visual field of a shooter or the like to the subject matter of the tip of the gun and the target, which allows for more concentration thereon during aiming. These and other advantages and objects of the present invention will be readily apparent, in part, based upon the detailed disclosure which follows.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

In the discourse to follow, the precepts of the present invention are illustrated in connection with its use in target shooting in general, and particularly in the sport of skeet shooting as the sighting demands imposed upon a typical skeet shooter provide a helpful basis in an understanding of the solutions now posed. However, in view of its advantages, it will be understood that the present invention will find application in essentially all shooting, archery, and angling sports, as well as in security and law enforcement operations. Indeed, the eyewear of the present invention, in mitigating glare-related vision problems such as asthenopia and veiling luminance loss of contrast, is suited for use as sunglasses, or for general use in any environment of glare-inducing illumination.

Figure 1:
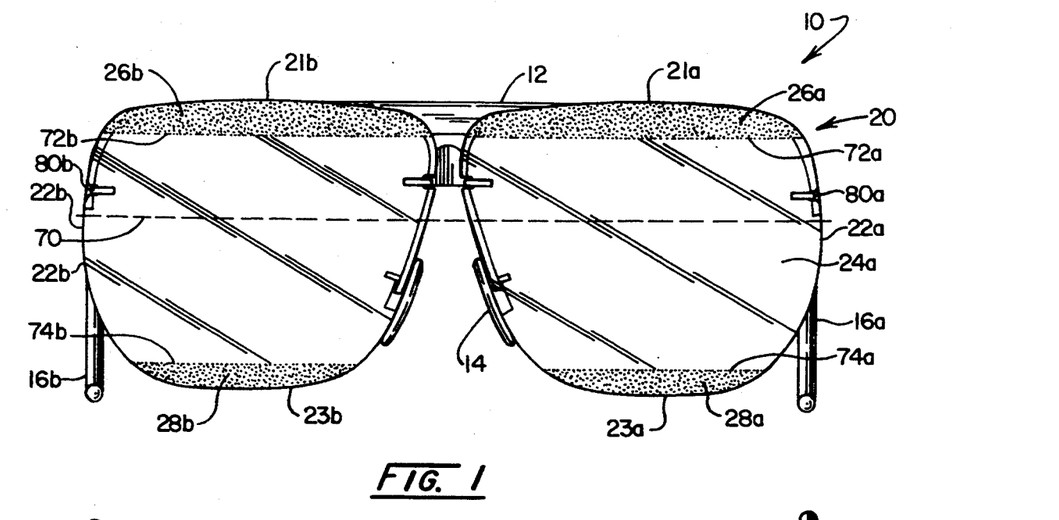
FIG. 1 is a front elevational view of a pair of shooting glasses having lens with translucent portions in accordance with the present invention.
Figure 2:
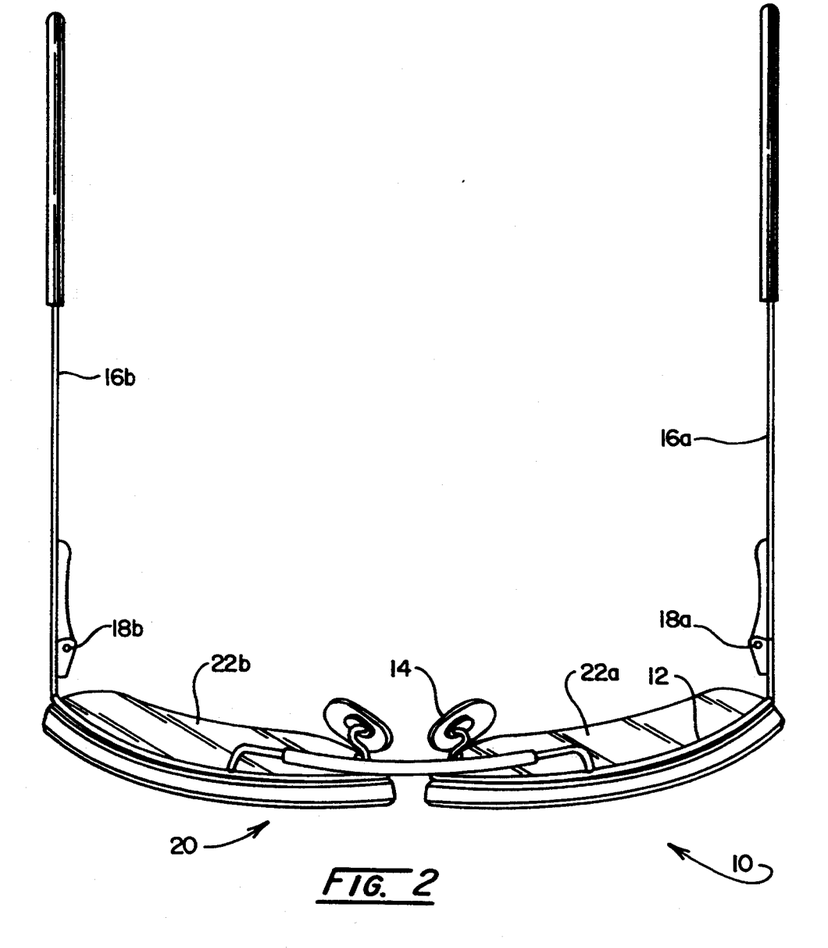
FIG. 2 is a top view of the shooting glasses of FIG. 1.

Looking to FIGS. 1 and 2, the eyewear of the present invention is shown generally at 10 as formed of a forward frame, 12, having a centrally-disposed nose support, 14, which may be provided as a pair of nose pads as shown or, alternatively, as an integrally-formed bridge component. Rearwardly extending from either side of frame 12 are left and right temples, 16a–b, each of which are mutually pivotally coupled to frame 12 as is shown at 18a–b. As is typical with eyeglasses, nose support 14, which is nestable over the nose bridge of the wearer, cooperates with left and right temples 18, which are configured to receive the ears of the wearer, in effecting the positioning of eyewear 10 about the head. As is typical for shooting glasses since the shooter is generally concerned with increasing his or her upward or overhead visual limit, support 14 may be configured so as to position eyewear 10 somewhat higher on the face than would be considered standard for conventional eyeglasses. For confronting the eyes of the wearer, frame 12 supports a frontal portion, shown generally at 20, extending between an upper periphery, 21a–b, and a lower periphery, 23a–b, and defining left and right eye lens regions, 22a–b, which regions may be configured as being plano or as having curvature aspects for functioning as corrective and/or filtering lenses. For impact resistance, it is preferred that lens regions 22 are formed of a shatter-proof, safety glass, or of a polymeric material such as a polycarbonate, an acrylic, or the like.

In accordance with the present invention, lens regions 22 are provided, respectively, with transparent optical regions, 24a–b, upper translucent regions, 26a–b, and lower translucent regions, 28a–b. In general, upper and lower translucent regions 26 and 28 are provided to normalize overhead and reflected glare to a level of diffuse illumination effective to reduce veiling luminance and asthenopic effects or eyestrain when eyewear 10 is worn by one, such as a skeet shooter, exposed to an environment of variational glare-inducing illumination. Accordingly, translucent regions 26 and 28 are formed as having light diffusing characteristics, but as allowing for the transmission of sufficient diffuse luminance to avoid in the wearer a claustrophobic or "blinder" effect which would otherwise be evoked were the regions to be formed of an opaque material. For achieving the preferred level of diffuse illumination in forming translucent regions 26 and 28, the surface of lens regions 22 may be roughened by sanding, sandblasting, chemical etching, or other similar techniques.

Alternatively, the surface of lens regions 22 may be coated with a coating composition loaded with an opacifying pigment at a level effective to create translucency. Suitable opacifying pigments include, for example: titanium dioxide, magnesium carbonate, polystyrene beads or similar plastic pigments, and the like. Additionally, the opacification of lens regions 22 may be achieved through the use of a coating composition, such as an epoxy-acrylic resin or a styrene-acrylic latex blend, which forms a heterogeneous, two-phase system when cured. Compositions wherein gloss is controlled via the addition of inorganic pigments having an average particle size about the same as or greater than the film thickness also may be employed so as to create a non-uniform or roughened surface coating. Such coatings, which may utilize silica, aluminum, or like pigments to achieve refraction sufficient to create translucency, afford the advantage of imparting a degree of abrasion resistance to the substrate being coated.

Binders for the coating compositions herein involved preferable are acrylic resins which may be thermoplastic or thermosetting, and UV- or heat-curable. Additional binders include polyester resins, polyurethanes (either 1- or 2-pack systems), epoxy resins, and the like. Such binders may be carried in an aqueous or non-aqueous vehicle, or even may be provided in a powdered form.

Yet another method for forming translucent regions 26 and 28 involves the generation of internal stress fractures within the polycarbonate or other polymeric material from which lens regions 22 may be formed. Such stress fractures may be formed, for example, by immersing the selected portion of lens regions 22 in a solvent such as methylene chloride. As the invention herein involved concerns the stated purpose and effect of providing the translucent regions 26 and 28 rather than any particular method for forming such regions, additional methods which may be conceived are anticipated to fall within the scope of the present invention.

Figure 3:
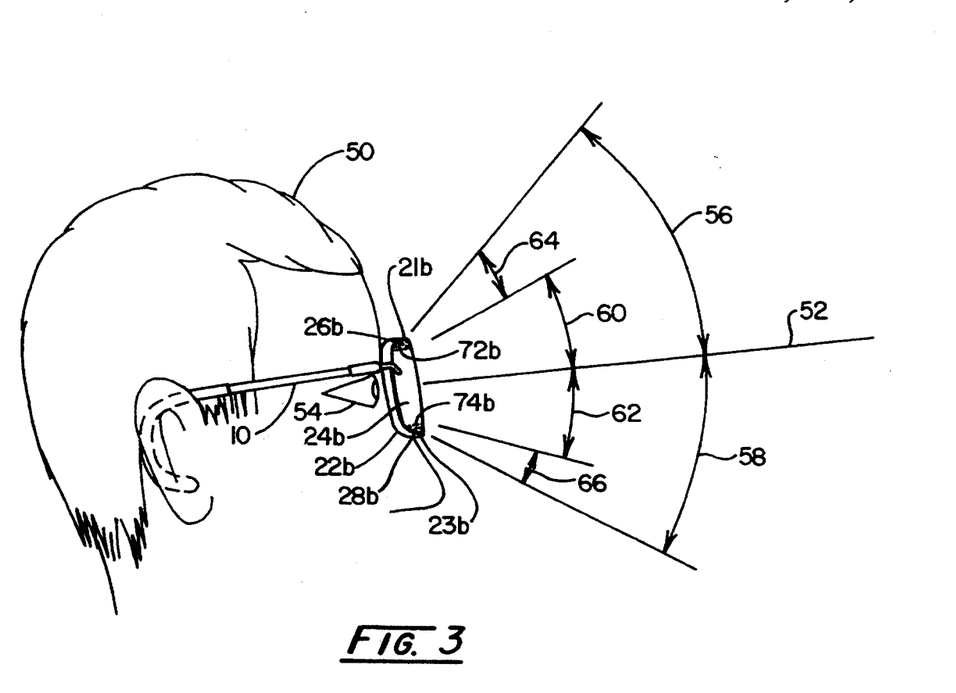
FIG. 3 is a side view of the head of a shooter wearing the shooting glasses of FIGS. 1 and 2.

Looking additionally to FIG. 3, the configuration of lens regions 22 is further considered in connection with the wearing of eyewear 10 by a shooter, 50, for example. From FIG. 3, shooter 50 may be seen to have a standard sight line (SSL), 52 when shooting aloft, extending, i.e. for the elevated target, upwards from horizontal from the forwardly-looking, mid pupillary position of eyes 54. SSL 52 may be considered to divide the normal visual limits of shooter 50 into an upper or superior field of view, which extends upwardly about 50° from SSL 52 as is represented by arc 56, and a lower or inferior field, which extends downwardly about 70° to 80° from SSL 52 as is represented by are 58. As aforementioned, the visual limit of upper field of view 56 may be extended somewhat by virtue of the configuring of nose support 14 (FIGS. 1 and 2) to position frontal portion 20 of eyewear 10 higher on the face of shooter 50 than would be conventional for normal eyeglasses. This is because a shooter typically looks upwardly to an airborne target. Within the visual limits defined by arcs 56 and 58, transparent optical regions 24 of lens regions 22 each are configured as having an area extent for intercepting lines of sight substantially above and below SSL 52 for providing shooter 50 with a field of view having the visual limits defined by arcs 60 and 62. However, as a result of the provision of translucent regions 26 and 28, the lines of sight within the portions of the superior and inferior fields represented, respectively, by arcs 64 and 66, are intercepted by translucent portions 26 and 28. Thus, the incidence of glare occasioned from overhead sources such as the sun, or that reflected from the ground or water surface, is substantially diminished by virtue of its interception by translucent portions 26 and 28. Accordingly, as may best be seen in FIG. 1, upper translucent regions 26 are provided to extend substantially upwardly from some location between SSL 52, now designated by the plane represented at dashed line 70, and upper periphery 21 of frontal portion 20. For maximum overhead glare reduction, it is preferred that regions 26 extend to upper periphery 21. Likewise, lower translucent regions 28 are provided to extend substantially downwardly from some location between SSL 52, represented by dashed line 70, and lower periphery 23. Again, it is preferred for maximum glare reduction that lower translucent regions extend to lower periphery 23. Depending upon the application for which eyewear 10 is intended or upon the preference of the wearer, however, translucent regions 26 and 28 may be extended or decreased in area extent to correspondingly provide an increased glare reduction or an extended field of view. Further, it is preferred for visual clarity that translucent regions 26 and 28 each are configured to define a linear, substantially horizontal border with transparent optical regions 22, as is shown at 72a-b for upper translucent regions 26, and at 74a-b for lower translucent regions 28.

Thus configured, it will be appreciated that when employed for such shooting sports as skeet, trap, sporting clays, and the like, eyewear 10 advantageously limits, without claustrophobic or blinder effects, the upper and lower fields of view of shooter 50 to the range defined by arcs 60 and 62. That is, in being restricted to a visual field limited substantially to that of the tip of the gun and the target, shooter 50 is afforded the ability to effect a greater concentration thereon during aiming. However, the primary advantage of translucent regions 26 and 28 is that of a reduction in discomfort glare transmitted or reflected to the eyes from objects within the superior and inferior fields of view. It may be recalled that such discomfort glare is caused by the viewing of an object of low luminance or brightness, such as a clay target or an animal, in the presence of a considerably higher luminance object, such as the sun and ground reflectance. Mitigation of such glare through the utilization of translucent regions 26 and 28 to achieve a normalized, essentially constant level of diffuse illumination therefore may be seen as effective to reduce discomfort glare and its associated eyestrain.

Diffuse illumination as perceived in the superior or inferior translucent region 26 and 28 allows the user to remain aware of and "track" high brightness (now diffuse) regions. Thus, the user may avoid head movements causing direct vision of such bright areas through the middle transparent region. Such tracking cannot be undertaken should, for example, the translucent regions be replaced with opaque light blockage.

Moreover, such normalization also may be seen as effective in improving the accommodation adaptation of the eyes. In this regard, it may be recalled that whenever the gaze of the eyes is changed to an object of a different brightness level, some period of time is required for the eyes to adapt to the different luminance level. As greater differences in luminance cause the eyes to take longer to adapt, the normalization of glare to an essentially constant level of diffuse illumination facilitates adaptation by decreasing any luminational variances. Inasmuch as the sensitivity of the eyes to detect detail are maximized when the eye is properly adapted to the ambient luminance level, it will be appreciated that the utilization of the present invention relieves not only eye discomfort, but also improves visual acuity.

The avoidance of discomfort glare through the shielding effect derived from translucent regions 26 and 28 also serves to minimize veiling luminance at the retina which, as a consequence, further enhances the contrast which is necessary in identifying visual targets. As aforementioned, veiling luminance is essentially a light scattering effect which causes a distribution of glare-generated illuminance across the retina. The resulting effect on vision is one wherein the overall illuminance in the retina is elevated., and the contrast which operates to achieve the acuity of an image is deleteriously affected in terms of decreased resolution sharpness and clarity and clarity. It has been observed that the utilization of conventional sunglasses or other simple filters before the eyes provides only a transmission reduction with no concomitant improvement in signal to noise ratio, i.e. contrast. However, in diffusively normalizing overhead and reflected glare to an essentially constant level, the eyewear of the present invention has been found to lower veiling luminance without affecting the visibility of the object of interest, and an associated improvement in visual acuity.

While an improvement in visual performance is achieved in the structuring of eyewear 10 as described, further improved performance may be realized by the tinting of transparent optical regions 24. For target shooting applications and the like, it is generally preferred that optical regions 24 are tinted with a color such as yellow which is selected from the mid spectral range of the visible spectrum. In this regard, it may be recalled that chromatic aberration is a phenomenon associated with broad-spectrum light wherein the eye will provide a focus position for a given object depending upon the wavelength of the light emanating from the object to be focused. As the image of an object generally is contained in light having a variety of wavelengths, essentially only one such wavelength can be focused precisely at the retina. All the other wavelengths will be focused at some focal length forward or rearward of the retina. A yellow filtering optical region serves to reduce, chromatic aberrations in the retina by eliminating certain of the wavelengths, such as blue, which are the most out of focus without a perceived over-darkening effect Eyewear 10 also may be structured for general use as sunglasses as reducing both reflected glare, as well as diminishing the sun to a diffuse disc of discernible illuminance within translucent regions 26. Generally, it has been found preferable to employ non-spectral pigmentation where eyewear 10 is to be utilized as sunglasses. In this regard, gray or brown tints are the most favored as green tints tend to evoke an over-darkening impression to the wearer. Wearers of eyewear 10 having the preferred gray, brown, or yellow tints have been observed to enjoy a low level of eye fatigue and improved acuity leading to an enhanced level of overall comfort. Where lens regions 22 of eyewear 10 are fashioned of a polycarbonate material, a desirable blocking of ultraviolet (UV) radiation additionally may be effected to provide the wearer with enhanced eye protection.

Looking again to FIG. 1, it may be seen that to facilitate the tailoring of eyewear 10 to any number of applications or illumination environments, frame 12 may be configured as having a pair of sideward clips, 80a–b, for interchangeably retaining lens regions 22. Thus, a number of lens pairs of different tints, such as yellow, brown, purple, and the like, may be utilized with eyewear 10 depending upon the prevailing luminance conditions or the preference of the wearer.

Next considered for illustrative purposes is the application of eyewear 10 to the sport of skeet shooting. Looking to FIG. 4, a skeet field is represented generally at 100 as having two "houses", a high house, 112, and a low house, 114. Clay targets are launched from high house 112 through a window therein which is located an elevation of about ten feet. When launched by a referee or observer at the command of the shooter, the clay targets, traveling about 75 mph (120 kmph), will follow the path represented by the dashed line shown at 116. Launching occurs as the puller or referee pushes a switch button which causes a launching mechanism to effect the target launch. From high house 112, the target will fly about 21 yards (19 m) to a position above a target crossing point, 118, and may continue another 22 yards (20 m) over a shooting boundary marker, 122, and then another 16 yards (14.5 m) to a target distance marker, 124. Alternately or simultaneously upon receiving a "pull" command from the shooter, the puller or referee will cause the launching of a target from the low house 114 which is positioned at an elevation closer to the ground than high house 112. As before, the target will fly at about 75 mph (120 kmph), but now along a path represented by the dashed line shown at 125 in progressing 21 yards (19 m) to pass over target crossing point 118, another 22 yards (20 m) to cross another shooting boundary marker, 126, and, finally, another 16 yards (14.5 m) to another target distance marker, 128.

Figure 4:
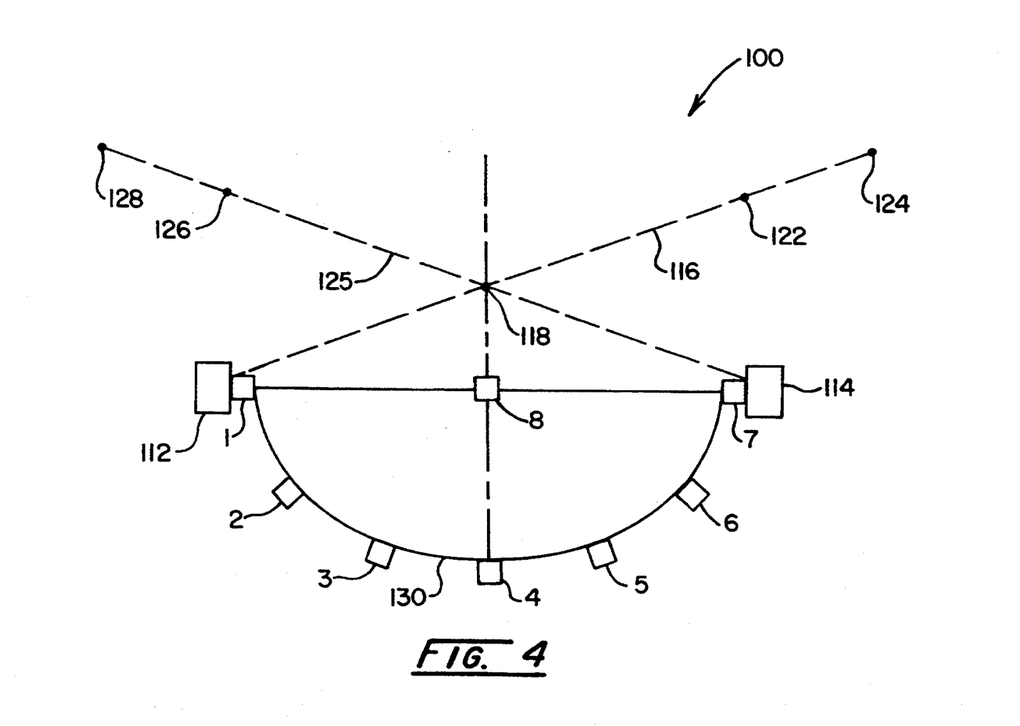
FIG. 4 is a diagrammatic plan view of a skeet field showing the various stations and angles on which a skeet shooter is positioned.

During the course of a round, each shooter takes a shooting position at each of eight shooting positions located about an arc, 130, extending between houses 112 and 114, which positions, respectively, are assigned by convention the station numbers 1–8 as is shown. To begin a round, the shooter, initially positioned at station 1, gives the "pull" command causing the referee to launch a target from high house 112. In response, the shooter then endeavors to swing his or her shotgun in a smooth fashion before firing to achieve an appropriate leading of the target culminating, hopefully, in its destruction. After the first shot, the shooter then gives another "pull" command causing the referee to launch a target from low house 114. Again, the shooter in response executes another appropriate lead and follow through in attempting to hit the target. The round continues in like manner progressing through stations 1–8, except that at stations 1, 2, 6, and 7, the shooter also shoots at a "double" wherein a crossing pair of targets are launched simultaneously from high house 112 and low house 114. In firing at such "doubles," the shooter generally will fire first at the target launched from the house which is the closer to the current station, and then will proceed to attempt to "pick up" the target launched from the other house. As the shooter moves from station to station, it will be appreciated that the change in his or her position with respect to high and low houses 112 and 114 necessitates a different lead and shooting technique for each station. For example, station 8 calls for the hitting the target while it is essentially over the head of the shooter. However, regardless of the station, one will observe in experienced shooters a smooth, consistent pivoting of the body and gun, and a regular and repeatable timing and gun mounting.

Figure 5:
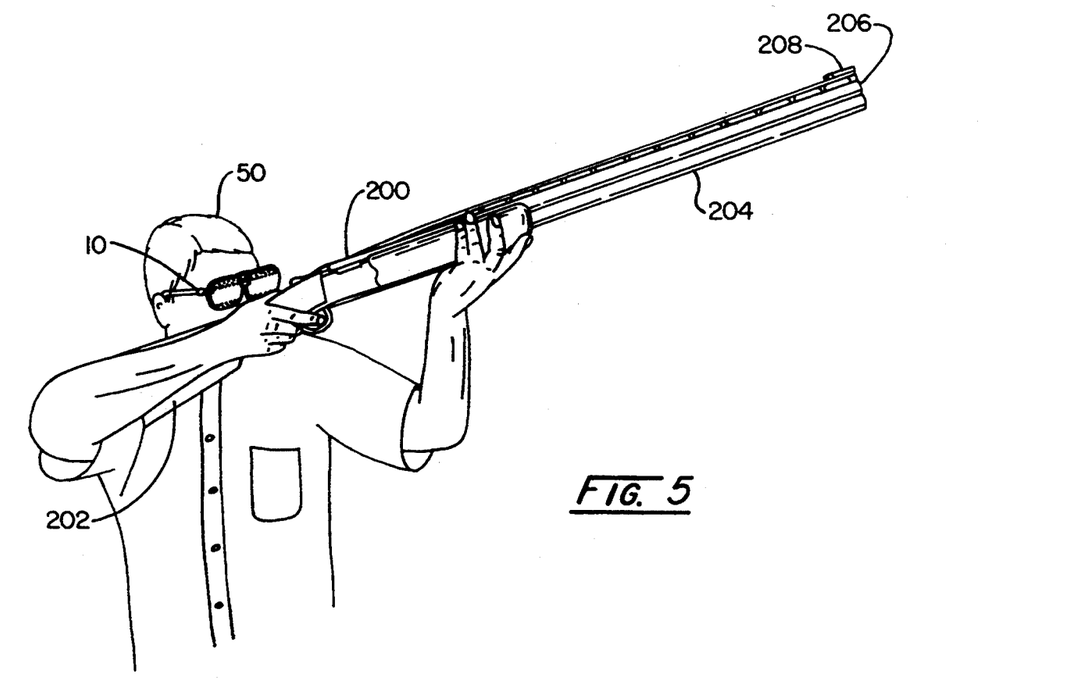
FIG. 5 is a perspective view of the shooter of FIG. 3 having a shotgun mounted and positioned for target acquisition.
Figure 6:
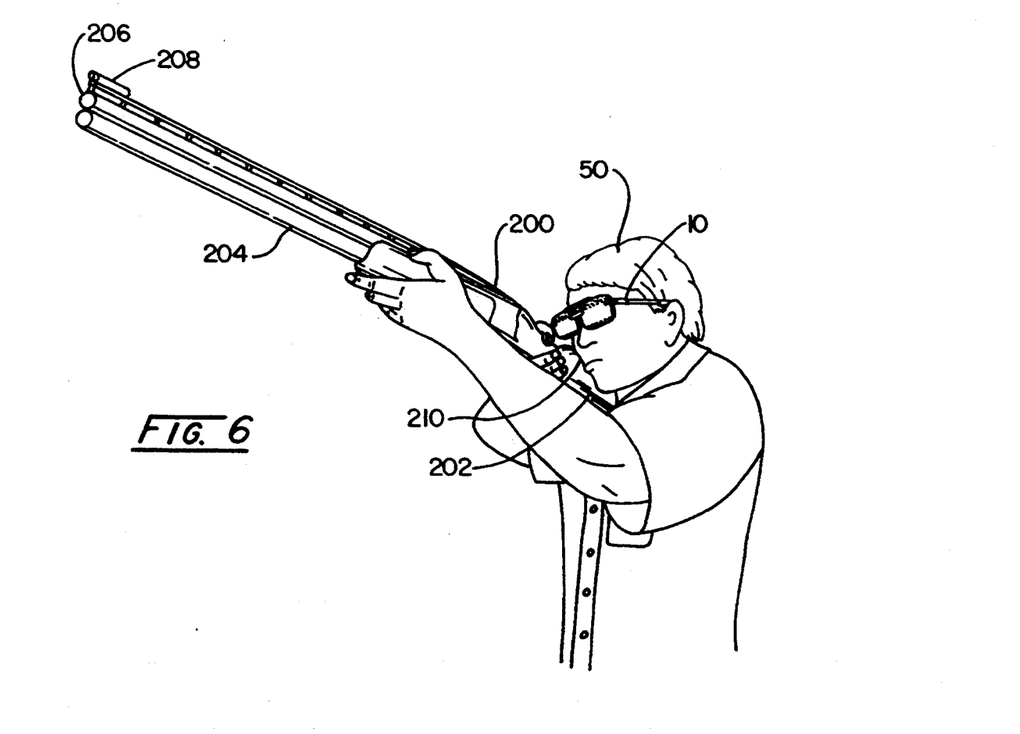
FIG. 6 is another perspective view of the shooter of FIG. 5.

The requisite timing and synchronous motion of the shooter may be described from a number of aspects, particularly those associated with the focusing capability of the human eye. As is apparent, it is necessary that the shooter maintain an attention to the small target moving at 75 mph (120 kmph) across the target path. This target is sufficiently distanced from the shooter that his or her eyes are, in general, focused essentially at infinity, i.e. at far field. As may be seen in FIGS. 5 and 6 wherein shooter 50 of FIG. 3 is shown in the act of aiming a shotgun, 200, the typical shotgun will have a stock, 202, extending to an elongate barrel, 204, which barrel culminates in a barrel tip, 206, and a forward sight, 208. Sight 208 may be formed as a metal bed, or, alternatively, as a sight apparatus providing a collimated light to the eye position of the shooter as is disclosed by Betz et al., U.S. Pat. No. 5,279,061, the disclosure of which is expressly incorporated herein by reference. To find and sustain an appropriate lead of the barrel axis with respect to the target position, it is somehow necessary that shooter 50 be aware, i.e., perceive, the location of tip 206 of shotgun 200. Optically, this would require that shooter 50 focus at tip 206 or sight 208 a distance generally of about 2.5 feet (0.75 m). An anomaly then becomes apparent in that most, if not all shooters, and particularly those of advancing age, are burdened with a visual system wherein the eye is unable to accommodate focusing at barrel tip 206, i.e., near field, while simultaneously focusing essentially at infinity, i.e., far-field, on the target. Thus, as is shown at 210 in FIG. 6, the better shooter will place his or her cheek against stock 202 of shotgun 200 such that the upper torso and eye station is aligned somewhat parallel with the gun axis along barrel 204 which, for target shooting, is pointed in a generally upward orientation. In this way, the shooter may mechanically maintain an awareness of the location of tip 206 of shotgun 200 even with both eyes focused at infinity on the target.

As is apparent, the aiming of a shotgun for skeet, trap, or sporting clays shooting, or for hunting and the like, demands an intense concentration on the part of the shooter. However, variations in brightness as the shooter turns his or her head, as well as glare generated from light above or reflected from below, interfere with this concentration as having to be accommodated for through complex brain-eye interfaces. As the shooter "sweeps" the shotgun across the firing region, different brightness effects, both direct and reflected are encountered. These effects are normalized and, to an extent, diminished with the eyewear the invention. In changing the overhead and reflected glare to a constant level of diffuse illumination, the eyewear of the present invention assists with such accommodation and provides the shooter with an enhanced visual acuity allowing for increased target concentration.

It is anticipated that certain changes may be made in the above described apparatus and method without departing from the scope of the invention herein involved. For example, the eyewear of the present invention may be configured as a "clip-on" type for use in conjunction with the present corrective eyeglasses of the wearer. Further, the frontal portion of the eyewear may be provided as a continuous optical region as is known in eyewear of the "goggle" varieties. Accordingly, it is intended that all matter contained in the foregoing description the accompanying drawings shall be interpreted as illustrative rather than as limiting.

What is claimed:

1. A method for reducing glare to the eyes of a person exposed to an environment of glare-inducing illumination variations, said person having a superior field of view extending radially upwardly from a standard sight line extending horizontally from the forwardly-looking, mid pupillary position of the eyes, and an inferior field of view extending radially downwardly from the standard sight line, said method comprising the steps of:
   (a) providing eyewear having a frontal portion for confronting the eyes of said person, said frontal portion extending between an upper and lower periphery and comprising:
      (i) a transparent optical region of an area extent for intercepting lines of sight substantially above and below the standard sight line of said person;
      (ii) an upper, uniformly translucent region extending substantially upwardly from between the standard sight line of said person and said upper periphery of said frontal portion for intercepting lines of sight within the superior field of view of said person; and
      (iii) a lower, uniformly translucent region extending substantially downwardly from between the standard sight line of said person and said lower periphery of said frontal portion for intercepting lines of sight within the inferior field of view of said person,
   said upper and said lower translucent region being formed as having uniform light diffusing characteristics effective to normalize overhead and reflected glare to an essentially constant level of diffuse illumination minimizing abrupt eye accommodations to the illumination variations, and
   (b) confronting the eyes of said person with said frontal portion of said eyewear.

2. The method of claim 1 wherein said transparent optical region of said eyewear frontal portion has a tint selected for providing an optical filter having a predetermined transmittance.

3. The method of claim 1 wherein said upper and said lower translucent region each define a linear, substantially horizontal border with said transparent optical region.

4. The method of claim 3 wherein said lower translucent region extends downwardly to said lower periphery of said eyewear frontal portion.

5. The method of claim 4 wherein said upper translucent region extends upwardly to said upper periphery of said eyewear frontal portion.

6. Eyewear for use by a person exposed to an environment of glare-inducing illumination variations, said person having a superior field of view extending radially upwardly from a standard sight line extending horizontally from the forwardly-looking, mid pupillary position of the eyes, and an inferior field of view extending radially downwardly from the standard sight line, said eyewear comprising:
   a frontal portion for confronting the eyes of said person extending between an upper and lower periphery;
   a transparent optical region within said frontal portion of an area extent for intercepting lines of sight substantially above and below the standard sight line of said person;
   an upper, uniformly translucent region within said frontal region extending substantially upwardly from between the standard sight line of said person and said upper periphery of said frontal portion for intercepting lines of sight within the superior field of view of said person; and
   a lower, uniformly translucent region extending substantially downwardly from between the standard sight line of said person and said lower periphery of said frontal portion for intercepting lines of sight within the inferior field of view of said person,
   said upper and said lower translucent region being formed as having uniform fight diffusing characteristics effective to normalize overhead and reflected glare to an essentially constant level of diffuse illumination minimizing abrupt eye accommodations to the illumination variations.

7. The eyewear of claim 6 wherein said transparent optical region has a tint selected for providing an optical filter having a predetermined transmittance.

8. The eyewear of claim 6 wherein said upper and said lower translucent region each define a linear, substantially horizontal border with said transparent optical region.

9. The eyewear of claim 8 wherein said lower translucent region extends downwardly to said lower periphery of said frontal portion.

10. The eyewear of claim 9 wherein said upper translucent region extends upwardly to said upper periphery of said frontal portion.

11. A method for reducing glare to the eyes of a shooter aiming a firearm at a remote, moving target within an ambient surround of glare-inducing illumination variations, said shooter having a superior field of view extending radially upwardly from a standard sight line extending horizontally from the forwardly-looking, mid pupillary position of the eyes, and an inferior field of view extending radially downwardly from the standard sight line, said method comprising the steps of:
- (a) providing eyewear having a frontal portion for confronting the eyes of said shooter, said frontal portion extending between an upper and lower periphery and comprising:
  - (i) a transparent optical region of an area extent for intercepting lines of sight substantially above and below the standard sight fine of said shooter;
  - (ii) an upper, uniformly translucent region extending substantially upwardly from between the standard sight line of said shooter and said upper periphery of said frontal portion for intercepting lines of sight within the superior field of view of said shooter; and
  - (iii) a lower, uniformly translucent region extending substantially downwardly from between the standard sight line of said shooter and said lower periphery of said frontal portion for intercepting lines of sight within the inferior field of view of said shooter,
  - said upper and said lower translucent region being formed as having uniform fight diffusing characteristics effective to normalize overhead and reflected glare to an essentially constant level of diffuse illumination minimizing abrupt eye accommodations to the illumination variations, and
- (b) confronting the eyes of said shooter with said frontal portion of said eyewear.

12. The method of claim 11 wherein said transparent optical region of said eyewear frontal portion has a tint selected for providing an optical filter having a predetermined transmittance.

13. The method of claim 12 wherein said tint is selected from the mid-spectral range of the visible spectrum.

14. The method of claim 11 wherein said upper and said lower translucent region each define a linear, substantially horizontal border with said transparent optical region.

15. The method of claim 14 wherein said lower translucent region extends downwardly to said lower periphery of said eyewear frontal portion.

16. The method of claim 15 wherein said upper translucent region extends upwardly to said upper periphery of said eyewear frontal portion.

17. Eyewear for use by a person exposed to an environment of glare-inducing illumination variations, said person having a superior field of view extending radially upwardly from a standard sight line extending horizontally from the forwardly-looking, mid pupillary position of the eyes, and an inferior field of view extending radially downwardly from the standard sight fine, said eyewear comprising:
- a forward frame having a centrally-disposed nose support and rearwardly-extending left and right temples for positioning said frame on the head of said person;
- a frontal portion supported by said frame defining left and right eye lens regions for confronting the eyes of said person, said frontal portion extending between an upper and lower periphery;
- a transparent optical region within each of said lens regions of an area extent for intercepting lines of sight substantially above and below the standard sight line of said person;
- an upper, uniformly translucent region within each of said lens regions extending substantially upwardly from between the standard sight line of said person and said upper periphery of said frontal portion for intercepting lines of sight within the superior field of view of said person; and
- a lower, uniformly translucent region within each of said lens regions extending substantially downwardly from between the standard sight line of said person and said lower periphery of said frontal portion for intercepting lines of sight within the inferior field of view of said person,
- said upper and said lower translucent region being formed as having uniform light diffusing characteristics effective to normalize overhead and reflected glare to an essentially constant level of diffuse illumination minimizing abrupt eye accommodations to the illumination variations.

18. The eyewear of claim 17 wherein said transparent optical region has a tint selected for providing an optical filter having a predetermined transmittance.

19. The eyewear of claim 17 wherein said upper and said lower translucent region each define a linear, substantially horizontal border with said transparent optical region.

20. The eyewear of claim 19 wherein said lower translucent region extends downwardly to said lower periphery of said eyewear frontal portion.

21. The eyewear of claim 20 wherein said upper translucent region extends upwardly to said upper periphery of said eyewear frontal portion.

* * * * *